United States Patent Office 3,523,964
Patented Aug. 11, 1970

3,523,964
PREPARATION OF AROMATIC ISOCYANATES
Ehrenfried H. Kober, Hamden, Wilhelm J. Schnabel, Branford, and Philip D. Hammond, North Haven, Conn., assignors to Olin Corporation, a corporation of Virginia
No Drawing. Filed Apr. 10, 1967, Ser. No. 629,388
Int. Cl. B01j 11/14; C07c 119/04
U.S. Cl. 260—453                                            24 Claims

ABSTRACT OF THE DISCLOSURE

An improvement in the process for preparing organic isocyanates directly by the reaction of corresponding organic nitro compounds with carbon monoxide in the presence of a catalyst, said improvement comprising reacting carbon monoxide with a liquid suspension of the catalyst at an elevated pressure and an elevated temperature prior to reacting the organic nitro compound with carbon monoxide.

---

This invention relates to an improved process for preparing organic isocyanates directly from the corresponding organic nitro compound.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgium Pat. No. 672,405, entitled, "Process for the Preparation of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of the invention to provide an improved process for the preparation of organic isocyanates.

Another object of the invention is to provide a novel technique for enhancing the activity of the catalyst system in the reaction for preparing organic isocyanates directly from the corresponding organic nitro compounds.

These and other objects of the invention will be apparent from the following detailed description thereof.

It has now been discovered that the above-mentioned objects are accomplished when the catalyst system is suspended in a liquid and carbon monoxide is dispersed through the resulting suspension at elevated temperature and elevated pressure. After being subjected to these conditions for a sufficient time to activate the catalyst, it is admixed with the organic nitro compound and the resulting mixture is reacted with carbon monoxide to effect conversion of the organic nitro compound to an organic isocyanate.

Catalysts which may be activated in accordance with the novel technique of this invention include elements and compounds of elements found in Groups Ib, IIb, IIIa, IIIb, IVa, IVb, Va, Vb, VIa, VIb, VIIa, VIII and the Lanthanide series of the Periodic Table. When comparing the effectiveness as a catalyst of a given weight of these metals and compounds of metals, it was found that certain metals and compounds of these metals had a much greater catalytic effect than others. Those metals, in elemental or compound form, which are preferred because they show the greatest catalytic effect, are as follows:

(1) Palladium     (9) Platinum
(2) Rhodium      (10) Cobalt
(3) Vanadium     (11) Nickel
(4) Molybdenum  (12) Germanium
(5) Tungsten      (13) Tin
(6) Tantalum      (14) Osmium
(7) Chromium    (15) Copper
(8) Niobium       (16) Silver Other metals which may also be employed as a catalyst either in elemental or a compound form, but which are less effective than those listed above are as follows:

(1) Aluminum     (19) Titanium
(2) Scandium     (20) Gold
(3) Manganese    (21) Mercury
(4) Iron            (22) Thallium
(5) Zinc           (23) Lead
(6) Gallium       (24) Cerium
(7) Yttrium       (25) Praseodymium
(8) Zirconium     (26) Neodymium
(9) Lutecium      (27) Illinium
(10) Masurium     (28) Samarium
(11) Ruthenium   (29) Europium
(12) Cadmium     (30) Gadolinium
(13) Indium       (31) Terbium
(14) Lanthanum   (32) Dysprosium
(15) Hafnium      (33) Holmium
(16) Silicon       (34) Erbium
(17) Rhenium     (35) Thulium
(18) Iridium       (36) Ytterbium Compounds of the above elements which can be activated in accordance with the process of this invention include oxides, sulfates, nitrates, halides, carbonates, sulfides, oxalates, and the like, and preferably a compound of one of the aforesaid preferred elements. Included in the latter group are platinum oxide, platinum dioxide, platinum dibromide, platinum dichloride, platinum tetrachloride, platinous cyanide, and platinum sulfate; palladium halides such as palladium dibromide, palladium dichloride, palladium difluoride, and palladium diiodide; rhodium halides such as rhodium tribromide, rhodium trichloride, rhodium trifluoride, and rhodium triiodide; palladium oxides such as palladium suboxide ($Pd_2O$), palladium monoxide (PdO), and palladium dioxide ($PdO_2$); rhodium oxides such as rhodium monoxide (RhO), rhodium sesquioxide ($Rh_2O_3$), and rhodium dioxide ($RhO_2$); chromic oxide ($Cr_2O_3$), chromium dioxide ($CrO_2$), and chromous oxide (CrO); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$), tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); and vanadium tetraoxide ($V_2O_4$), and vanadium pentoxide ($V_2O_5$), mixtures thereof, and the like.

In addition, carbonyls of certain elements such as nickel, cobalt, iron, rhodium, molybdenum, chromium, tungsten and carbonyl chlorides of certain elements such as palladuim, rhodium, and any of the aforesaid elements capable of forming carbonyls can be used as the catalyst. Mixtures of two or more of these compounds may be employed as the catalyst system.

Although all of the aforesaid catalyst systems may be activated to have some effect upon increasing the yield of organic isocyanates, certain systems are significantly more effective than others. Included in these more effective systems are those comprised of a mixture of at least one compound selected from the group consisting of palladium halides, rhodium halides, palladium oxides, and rhodium oxides with an oxide of an element selected from the group consisting of vanadium, molybdenum, tungsten, niobium, chromium, and tantalum, with or without other catalysts, and especially the following:

(1) Palladium dichloride and vanadium pentoxide
(2) Palladium dichloride and molybdenum dioxide
(3) Rhodium trichloride and vanadium pentoxide
(4) Rhodium trichloride and molybdenum dioxide
(5) Palladium dichloride, rhodium trichloride and vanadium pentoxide.
(6) Rhodium trichloride, platinum tetrachloride and vanadium pentoxide
(7) Palladium dichloride, molybdenum dioxide and cupric bromide
(8) Palladium dichloride, rhodium trichloride, vanadium pentoxide and cupric bromide When one of the above-mentioned preferred catalyst systems is employed, the weight ratio of palladium or rhodium compound to oxide of the Group Vb or VIb metals in the catalyst system is generally in the range between about 0.001:1 and about 25:1, and preferably in the range between about 0.05:1 and about 10:1, but greater or lesser proportions may be employed if desired. When other catalytic additives such as cupric bromide, platinum tetrachloride and the like are employed as part of the catalyst system the weight ratio of the catalytic additive to the oxide of the Group Vb or VIb metals is also within the above-mentioned catalyst ratio ranges.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

Activation of the catalyst system is effected by suspending the catalyst in a suitable liquid which is capable of dissolving the organic nitro compound subsequently added. Suitable liquids include aliphatic, cycloaliphatic, aromatic solvents such as n-heptane, cyclohexane, benzene, toluene, and xylene, and halogenated aliphatic and aromatic hydrocarbons such as dichloromethane, tetrachloroethane, monochloronaphthalene, monochlorobenzene, dichlorobenzene, trichloroethylene, and perchloroethylene, as well as sulfur dioxide, mixtures thereof and the like.

The proportion of liquid is not critical and any proportion may be employed which will act as a suspending medium for the catalyst. Generally, the weight percent of catalyst in the liquid is in the range between about 1 and about 50 percent, but greater or lesser proportions may be employed if desired.

The slurry of catalyst in liquid is formed or placed, as the case may be, in a pressure vessel, such as an autoclave which is equipped with a gas sparger for feeding carbon monoxide into the bottom thereof. The pressure vessel is also preferably provided with agitation means as well as heating and cooling means. After the pressure vessel is sealed, sufficient carbon monoxide is fed to the pressure vessel to maintain the pressure in the range between about 30 and about 10,000, and preferably between about 100 and about 8,000 p.s.i.g. under the temperature conditions obtained. The temperature of the catalyst suspension is maintained above about 25 and preferably between about 100 and about 250° C. during the activation procedure.

Carbon monoxide may be fed batchwise, intermittently or continuously during the entire activation period, the technique employed depending upon the type of reactor employed. The activation period will vary with the type of catalyst and the degree of activation desired, but is generally in the range betwen about 0.1 and about 5, and preferably between about 0.2 and about 3 hours but shorter or longer periods may be employed if desired.

The activated catalyst prepared in accordance with the technique of this invention is admixed with an organic nitro compound, and carbon monoxide is then reacted with the organic nitro compound at elevated temperature and elevated pressure to yield an organic isocyanate.

The organic nitro compound is preferably added to the suspension of catalyst, after making whatever adjustments in pressure and temperature that are necessary to permit adding additional materials to the reaction vessel. If desired, however, the activated catalyst may be separated from the suspension and admixed with the organic nitro compound in a different or the same pressure vessel.

Any organic nitro compound capable of being converted to an organic isocyanate may be employed as a reactant. Generally, aromatic, cycloaliphatic, and aliphatic mono- or polynitro compounds which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) AROMATIC NITRO COMPOUNDS (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) NITROCYCLOALKANES (a) Nitrocyclobutane
(b) Nitrocyclopentane
(c) Nitrocyclohexane
(d) Dinitrocyclohexanes
(e) Bis(nitrocyclohexyl)methanes (III) NITROALKANES (a) Nitromethane
(b) Nitroethane
(c) Nitropropane
(d) Nitrobutanes
(e) Nitrohexanes
(f) Nitrooctanes
(g) Nitrooctadecanes (h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-Dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) Alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) Alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane
(78) 3,3'-dimethoxy-4,4'-dinitro-biphenyl
(79) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanate substituents, such as 2-isocyanato-4-nitrotoluene, may also be employed as a reactant. Aromatic nitro compounds are preferably employed as a reactant. Generally, the organic nitro compounds and substituted organic nitro compounds contain between 1 and about 14 carbon atoms.

The reaction is carried out in the presence of a catalytic proportion of the activated catalyst system. The proportion of catalyst system is generally equivalent to between about 0.1 and about 100 percent, and preferably between about 1 and about 60 percent by weight of the organic nitro compound. However, greater or lesser proportions may be employed if desired.

The reaction between carbon monoxide and organic nitro compound may be effected in the absence of a solvent, but improved overall yields of the organic isocyanates can be obtained when a solvent which is chemically inert to the components of the reaction system is employed. Suitable solvents include aliphatic, cycloaliphatic, aromatic solvents such as n-heptane, cyclohexane, benzene, toluene, and xylene, and halogenated aliphatic and aromatic hydrocarbons such as dichloromethane, tetrachloroethane, monochloronaphthalene, monochlorobenzene, dichlorobenzene, trichloroethylene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, activated catalyst system, and, if desired, solvent, is charged to a suitable pressure vessel such as an autoclave which was previously purged with nitrogen, and which is preferably provided with agitation means such as a stirrer or an external rocking mechanism. Carbon monoxide is fed into the autoclave until a pressure is attained which is in the range between about 30 and about 10,000 p.s.i.g., and preferably between about 100 and about 8000 p.s.i.g., but greater or lesser pressures may be employed if desired.

Generally, the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I)  $R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50, and preferably between about 8 and 15 moles of carbon monoxide per nitro gorup in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, on the catalyst and on the amount of catalyst being charged, as well as the type of equipment being employed. Usually between one-half hour and 20 hours are required to obtain the desired degree of reaction, but shorter or longer reaction times may be employed.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any byproducts that may be formed.

Organic isocyanates produced in accordance with the technique of this invention are suitable for use in preparing urethane compounds such as foams, coatings, fibers, and the like by reacting the organic isocyanate with a suitable polyether polyol in the presence of a catalyst and, if desired, a foaming agent, and as intermediates for biologically active compounds.

The activated catalyst system of this invention is particularly effective when used in the process in which the organic nitro compound is reacted with carbon monoxide in the presence of a small proportion of an acid halide, as described in copending patent application Ser. No. 629,389, filed Apr. 10, 1967, by Ehrenfried H. Kober, Wilhelm J. Schnabel, Theodore C. Kraus and Gerhard F. Ottomann, entitled, "Process."

The process described in the latter patent application is carried out in the presence of an acid halide capable of enhancing the activity of the catalyst while stabilizing the organic isocyanate as it is formed. Acid halides useful for this purpose are selected from the group consisting of acid halides of carbon, acid halides of sulfur, acid halides or phosphorus, acid halides of vanadium and organic acid halides (RCO Hal) and organic sulfonyl halides ($RSO_2$ Hal) where R is selected from the group consisting of an aromatic, aliphatic, and mixed aromatic-aliphatic moiety. Typical examples of suitable halides include phosgene, thionyl chloride, thionyl bromide, thionyl fluoride, sulfonyl chloride, phosphorus oxychloride, phosphorus oxyfluoride, phosphorus oxybromide, vanadyl monobromide (VOBR), vanadyl dibromide ($VOBr_2$), vanadyl tribromide ($VOBr_3$), vanadyl chloride $[(VO)_2Cl]$ vanadyl dichloride ($VOCl_2$), and vanadyl trichloride ($VOCl_3$), Suitable organic acid chlorides include benzoyl chloride, acetyl chloride, propionyl chloride, oxalyl chloride, fumaryl chloride, succinyl chloride. Other suitable compounds include the carbonic acid chlorides and sulfonic acid chlorides described in Canadian Pat. No. 692,093, issued Aug. 4, 1964, to Ehrenfried H. Kober et al.

The proportion of acid halide is generally equivalent to between about 0.005 and about 0.1 and preferably between about 0.006 and about 0.09 mole of acid halide per mole of nitro groups in the organic nitro compound.

The following examples are presented to describe the invention more fully without any intention of being limited thereby. All parts and percentages are by weight unless otherwise specified.

EXAMPLE 1

Into a 100-ml. stainless steel autoclave were placed 0.18 g. of rhodium trichloride ($RhCl_3$), 0.36 g. of vanadium pentoxide ($V_2O_5$), and 5 ml. of orthodichlorobenzene. The autoclave was sealed, purged with carbon monoxide, vented and then filled with carbon monoxide to a pressure of 1800 p.s.i.g. The autoclave and contents were then heated to 190° C. for 1.5 hours with agitation, after which the pressure was lowered to 1000 p.s.i.g. Nitrobenzene (6 grams) as injected into the autoclave from an attached stainless steel cylinder using carbon monoxide pressure in excess of 1000 p.s.i.g. The autoclave pressure was increased with carbon monoxide to 1300 p.s.i.g. and the reaction performed at 190° C. for 30 minutes with shaking. At the end of this period the autoclave was vented, then opened, and the contents removed for analysis. Analysis by vapor phase chromatography showed a nitrobenzene conversion of 46 percent and a yield of phenylisocyanate of 38 percent.

EXAMPLE 2

The procedure of Example 1 was repeated except that the catalyst was a mixture of 0.18 g. of palladium dichloride ($PdCl_2$) and 0.36 g. of vanadium pentoxide ($V_2O_5$). The catalyst pretreatment was conducted at a pressure of 2020 p.s.i.g., and at 190° C. for 1.5 hours. After addition of nitrobenzene, the autoclave was pressurized with carbon monoxide to an initial pressure of 2190 p.s.i.g., and the reaction was performed at 190° C. for 30 minutes. Analysis of the reaction mixture by vapor phase chromatography showed a 61 percent conversion of the nitrobenzene and a 60 percent yield of phenylisocyanate.

EXAMPLE 3

A procedure similar to Example 1 was employed in this example. The catalyst system was comprised of 0.18 g. of rhodium trichloride ($RhCl_3$), 0.060 g. of platinum tetrachloride ($PtCl_4$), and 0.36 g. vanadium pentoxide ($V_2O_5$). The solvent was orthodichlorobenzene containing 2.5 percent phosgene. The period of pretreatment of the catalyst was 1.5 hours at 190° C. at a pressure of 3750 p.s.i.g. After catalyst pretreatment, 2.9 g. of 2,4-dinitrotoluene was injected into the reactor. The pressure in the autoclave was raised to 3400 p.s.i.g. with carbon monoxide and the reaction was performed at a reaction temperature of 190° C. and a reaction time of 90 minutes.

Analysis of the liquid phase of the reaction product showed a conversion of 50 percent of the dinitrotoluene, a yield of 24 percent as 2,4-toluene diisocyanate, and a yield of 19 percent as monoisocyanato-mononitrotoluenes.

EXAMPLE 4-15

The procedure of Example 1 was repeated, with the exceptions indicated below and in the table, using the apparatus of Example 1. Unless otherwise indicated in each example the catalyst was shaken with 5 milliliters of orthodichlorobenzene for 90 minutes at a temperature of 190° C. at the pressure shown in the table under "Pretreatment Pressure Range, P.S.I.G." After pretreatment of the catalyst, 3 grams of 2,4-dinitrotoluene were added to the autoclave and the reaction mixture was heated for 90 minutes at a temperature of 190° C. at the pressure indicated in the table under "Reaction Pressure Range, P.S.I.G." The table also shows the catalyst, proportions of catalyst, percent conversion, and percent yield of toluene diisocyanate and total monosiocyanates.

Comparative Example "A" shows that when the reaction was carried out under conditions corresponding to those of Example 15 except for the catalyst pretreatment step of this invention, no isocyanate was formed, as compared to a conversion of 26 percent and a yield of phenylisocyanate of 78 percent obtained with catalyst pretreatment of this invention.

300 ml. stainless steel autoclave fitted with a magnetically driven propeller blade stirrer, a carbon monoxide inlet tube which reached beneath the surface of the reaction mixture, a gas outlet tube, liquid sampling device, cooling coil, electrical heating jacket, and thermocouple. The gas exhaust line passed through a condenser and phase separator, which returned condensed vapors to the reactor, and conveyed the gases to a vapor phase chromatograph monitor where the concentration of carbon monoxide and carbon dioxide was determined.

In each example, the reactor was charged with monochlorobenzene, palladous chloride ($PdCl_2$), and vanadium pentoxide ($V_2O_5$) in the proportions indicated in the table. After assembly and sealing of the autoclave, the stirring mechanism was started and the system pressure was tested with nitrogen to the anticipated operating pressure. The nitrogen was vented, the complete system purged twice with carbon monoxide gas by pressuring and venting, and the system finally pressured a third time with carbon monoxide to the desired operating pressure. The reactor system was then heated to the pretreatment

| Example No. | Catalyst Percent | Percent | Percent | Pretreatment pressure range, p.s.i.g. | Reaction pressure range, p.s.i.g. | Conversion, percent | TDI yield, percent | Total yield monoisocyanate, percent |
|---|---|---|---|---|---|---|---|---|
| a 4 | $PdCl_2$, 6 | $V_2O_5$, 12 | | 2,590–4,140 | 2,350–3,600 | 74 | 3 | 27.1 |
| a 5 | $RhCl_3$, 6 | $V_2O_5$, 3 | | 2,320–3,370 | 2,300–3,400 | 22 | 2 | 26.2 |
| b 6 | $RhCl_3$, 3 | $V_2O_5$, 6 | | 2,400–3,510 | 2,400–3,620 | 51 | 6 | 26.3 |
| c 7 | $PdCl_2$, 3 | $V_2O_5$, 3 | | 3,570–3,700 | 2,630–3,800 | 99 | | 62.0 |
| d 8 | $PdCl_2$, 3 | $V_2O_5$, 6 | | 2,600–3,800 | 2,600–3,830 | 91 | 29.4 | 43.0 |
| d 9 | $MoO_2$, 12 | $CuBr_2$, 3 | $PdCl_2$, 6 | 2,600–3,920 | 2,400–3,620 | 79 | 8 | 34 |
| b 10 | $RhCl_3$, 6 | $PtCl_4$, 4 | $V_2O_5$, 12 | 2,775–4,285 | 2,800–4,080 | 73 | 2 | 47 |
| b 11 | $RhCl_3$, 6 | $PtCl_4$, 1.0 | $V_2O_5$, 12 | 2,700–4,165 | 2,700–4,000 | 70 | 26 | 28 |
| e 12 | $PdCl_2$, 6 | $MoO_2$, 12 | $ReCl_5$, 2 | 2,600–3,840 | 2,590–3,800 | 65 | 6 | 38 |
| e 13 | $RhCl_3$, 6 | $FeCl_3$, 3 | $MoO_2$, 12 | 2,600–4,000 | 2,520–3,900 | 63 | 3 | 30 |
| e 14 | $RhCl_3$, 6 | $MoO_2$, 12 | $CuBr_2$, 3 | 2,525–4,060 | 2,425–3,780 | 84 | 10 | 34 |
| c 15 | $PdCl_2$, 3 | | | 2,530–3,975 | 2,565–3,700 | 26 | | 78 |
| c, f A | $PdCl_2$, 3 | | | | 2,395–3,845 | 0 | | 0 |

(a) Pretreatment temperature of 210°C, reaction time of 30 minutes, and reaction temperature of 210° C. (b) Orthodichlorobenzene contained 5 percent phosgene. (c) Organic nitro compound was 6 grams of nitrobenzene. (d) Solvent included orthodichlorobenzene as well as 4.5 grams of phenol. (e) Reaction time was 180 minutes. (f) No pretreatment.

EXAMPLE 16

Palladous chloride (3.0 g.), vanadium pentoxide (3.0 g.) and orthodichlorobenzene (70 g.) were charged to a 300 ml. stainless steel autoclave, fitted with a stirrer. The autoclave was pressurized with carbon monoxide to 1000 p.s.i.g., heated with stirring at 190° C., for 1.5 hours, and then cooled to room temperature. The pressure was released, 4-isocyanato-2-nitrotoluene (25.0 g). was charged, and the pressure of the autoclave was raised to 1000 p.s.i.g. The contents were stirred and heated at 190° C. for 1.5 hours. At the end of this period, the autoclave was cooled and the pressure was released. Analysis of the reaction product by vapor phase chromatograph indicated a conversion of 51.5 percent and a yield of 2,4-toluene diisocyanate of 36 percent.

EXAMPLES 17-21

The apparatus employed in these examples included a temperature indicated in the table. The flow of carbon monoxide gas was started and adjusted to the desired flow rate of 500 cc. per minute by means of a rotometer-valve arrangement.

After carbon monoxide is fed to the reactor at this rate for the pretreatment period indicated in the table, nitrobenzene was pumped into the reactor in the proportion indicated in the table. The reactor temperature was raised to the indicated reaction temperature and maintained at this level throughout the remainder of the reaction. Samples (2 ml.) were withdrawn from the reactor at approximately 1 hour intervals, and analyzed by vapor phase chromatography, a 2 ml. throw-away sample being removed just prior to the removal of each sample for analysis in order to purge the sampling tube. The reaction was terminated when carbon dioxide evolution indicated that the reaction was substantially complete.

| Example No. | 17 | 18 | 19 | 20 | 21 |
|---|---|---|---|---|---|
| Monochlorobenzene, grams | 125 | 125 | 125 | 100 | 100 |
| $PdCl_2$, grams | 1.0 | 1.0 | 1.0 | 2.0 | 2.0 |
| $V_2O_5$, grams | 0.66 | 0.66 | 0.66 | 1.3 | 1.3 |
| Pretreatment, minutes | 31 | 39 | 32 | 150 | 125 |
| Pretreatment, temperature, ° C. | 160–182 | 148–178 | 160–180 | 144–176 | 168–170 |
| Nitrobenzene, grams | 20 | 20 | 20 | 40 | 40 |
| Reaction time, minutes | 310 | 403 | 308 | 232 | 253 |
| Reaction time, temperature, ° C., range | 164–181 | 169–180 | 167–182 | 176–184 | 176–183 |
| Pressure, p.s.i.g [1] | 860–1,000 | 940–1,000 | 1,000 | 1,000 | 500 |
| Conversion, percent | 93 | 100 | 95 | 90.5 | 93 |
| Yield, percent phenylisocyanate | 89.5 | 83.5 | 82 | 88.7 | 91.9 |

[1] Pressure for both pretreatment and reaction.

EXAMPLES 22-51

By the procedure described in Example 4, the following catalysts, frequently in combination with other catalysts such as at least one halide of palladium or rhodium and/or an oxide of vanadium or molybdenum, the catalyst system always including a nobel metal based catalyst, were pretreated in accordance with the technique of this invention and then used in the reaction between an organic nitro compound and carbon monoxide to yield organic isocyanates.

| EXAMPLE: | Catalyst |
|---|---|
| 22 | $PtO_2$. |
| 23 | $Ag_2O$. |
| 24 | $VOCl_2$. |
| 25 | $Pd(CO)Cl$. |
| 26 | $AlCl_3$. |
| 27 | $Pd$ °. |
| 28 | $Pd(C_6H_5CH)_2Cl_2$. |
| 29 | $Cu_2O$. |
| 30 | $MoO_2H_3PO_4$. |
| 31 | $IrCl_3$. |
| 32 | $CrCl_3$. |
| 33 | $V_2O_5$ on activated α-alumina. |
| 34 | $V_2O_5$ on aluminum phosphate. |
| 35 | $V_2O_5$ on α-alumina. |
| 36 | $V_2O_5$ on β-alumina powder-trihydrate. |
| 37 | $V_2O_5$ on 20% chromia on alumina. |
| 38 | $V_2O_5$+10% $PdCl_2$ on silica gel. |
| 39 | $V_2O_5$+10% $RhCl_3$ on silica gel |
| 40 | 20 $V_2O_5$ impregnated on vegetable carbon. |
| 41 | $V_2O_5$ on $SiO_2$. |
| 42 | $VCl_3$. |
| 43 | $FeCl_3$. |
| 44 | $W(CO)_6$. |
| 45 | $PtCl_2$. |
| 46 | $RuO_4$. |
| 47 | $OsCl_3$. |
| 48 | $CH_3MgBr$. |
| 49 | $Mo(CO)_6$ on silicia gel. |
| 50 | Copper chromite, $CuCr_2O_4$. |
| 51 | Silicon with 10 percent $V_2O_5$ and 2 percent $PdCl_2$. |

Various modifications of the invention, some of which are reviewed above, may be employed without departing from the spirit of the invention.

What is desired to be secured by Letters Patent is:

1. In the process for preparing an aromatic isocyanate by reacting an aromatic nitro compound and carbon monoxide in the presence of a catalyst, the improvement which comprises reacting carbon monoxide with a liquid suspension of said catalyst at an elevated temperature and an elevated pressure prior to reacting the aromatic nitro compound with carbon monoxide, the proportion of carbon monoxide reacted with said liquid suspension being sufficient to maintain the pressure in the range between about 30 and about 10,000 p.s.i.g. the liquid portion of said liquid suspension being a liquid capable of dissolving said aromatic nitro compound subsequently added, said catalyst being selected from the group consisting of:
   (a) a compound selected from the group consisting of
      (1) palladium halides,
      (2) rhodium halides,
      (3) palladium oxides,
      (4) rhodium oxides, and
      (5) mixtures thereof, and
   (b) a mixture of a compound (a) with an oxide of an element selected from the group consisting of
      (1) vanadium,
      (2) molybdenum,
      (3) tungsten,
      (4) niobium,
      (5) chromium, and
      (6) tantalum.

2. The process of claim 1 wherein the reaction of the organic nitro compound and carbon monoxide is carried out in the presence of an acid halide in a proportion equivalent to between about 0.005 to about 0.1 mole of acid halide per mole of nitro group in said aromatic nitro compound.

3. The process of claim 1 wherein said elevated temperature is in the range between about 25 and about 250° C.

4. The process of claim 3 wherein said catalyst is a mixture of palladium dichloride and vanadium pentoxide.

5. The process of claim 3 wherein said catalyst is a mixture of palladium dichloride and molybdenum dioxide.

6. The process of claim 3 wherein said catalyst is a mixture of rhodium trichloride and vanadium pentoxide.

7. The process of claim 3 wherein said catalyst is a mixture of rhodium trichloride and molybdenum dioxide.

8. The process of claim 3 wherein said catalyst is a mixture of rhodium trichloride, palladium dichloride and vanadium pentoxide.

9. The process of claim 3 wherein said catalyst is a mixture of platinum tetrachloride, rhodium trichloride and vanadium pentoxide.

10. The process of claim 3 wherein said catalyst is a mixture of palladium dichloride, molybdenum dioxide and cupric bromide.

11. The process of claim 3 wherein said catalyst is a mixture of palladium dichloride, rhodium trichloride, vanadium pentoxide and cupric bromide.

12. The process of claim 3 wherein said liquid is selected from the group consisting of halogenated aliphatic hydrocarbons, halogenated aromatic hydrocarbons and sulfur dioxide.

13. The process of claim 3 wherein said liquid is orthodichlorobenzene.

14. The process of claim 3 wherein said liquid is monochlorobenzene.

15. The process of claim 3 wherein the reaction of the organic nitro compound and carbon monoxide is carried out in the presence of an acid halide in a proportion equivalent to between about 0.005 to about 0.1 mole of acid halide per mole of nitro group in said aromatic nitro compound of an acid halide.

16. The process of claim 3 wherein said organic nitro compound is an aromatic nitro compound.

17. The process of claim 16 wherein said aromatic nitro compound is nitrobenzene.

18. The process of claim 16 wherein said aromatic nitro compound is monoisocyanato-mononitrobenzene.

19. The process of claim 16 wherein said liquid is selected from the group consisting of halogenated aliphatic hydrocarbons, halogenated aromatic hydrocarbons and sulfur dioxide.

20. The process of claim 16 wherein said aromatic nitro compound is dinitrotoluene.

21. The process of claim 20 wherein said liquid is orthodichlorobenzene.

22. The process of claim 20 wherein said liquid is monocholorobenzene.

23. The process of claim 16 wherein the reaction of the organic nitro compound and carbon monoxide is carried out in the presence of an acid halide in a proportion equivalent to between about 0.005 to about 0.1 mole of acid halide per mole of nitro group in said aromatic nitro compound.

24. The process of claim 23 wherein the reaction of said organic nitro compound and carbon monoxide is carried out in the presence of a small proportion of an acid halide selected from the group consisting of benzoyl chloride, thionyl chloride, phosgene, oxalyl chloride, sulfurfyl chloride, vanadium oxychloride and phosphorus oxychloride.

References Cited

UNITED STATES PATENTS

| | | | |
|---|---|---|---|
| 1,848,723 | 3/1932 | Jaeger | 252—415 XR |
| 1,915,618 | 6/1933 | Ralston et al. | 252—415 XR |
| 2,366,531 | 6/1945 | Ipatieff et al. | 252—415 XR |
| 3,057,915 | 10/1962 | Riemenschneider et al | 252—415 XR |
| 3,405,156 | 10/1968 | Stern et al. | 260—453 |

FOREIGN PATENTS 672,405  5/1966  Belgium.

CHARLES B. PARKER, Primary Examiner

D. H. TORRENCE, Assistant Examiner

U.S. Cl. X.R.

252—417, 438, 439, 440, 441, 461, 463, 467, 470, 472, 475, 476; 260—644, 645, 646, 689